Aug. 9, 1949.  W. TRAUPEL  2,478,851

GAS TURBINE PLANT

Filed Sept. 13, 1947

INVENTOR
WALTER TRAUPEL.
BY K. A. Mayr
ATTORNEY

Patented Aug. 9, 1949

2,478,851

UNITED STATES PATENT OFFICE 2,478,851

GAS TURBINE PLANT

Walter Traupel, Winterthur, Switzerland, assignor to Sulzer Freres, Societe Anonyme, Winterthur, Switzerland Application September 13, 1947, Serial No. 773,870
In Switzerland August 22, 1946

Section 1, Public Law 690, August 8, 1946

6 Claims. (Cl. 60—49)

The present invention relates to gas turbine plants in which an operating medium circulates in a cycle in which it is compressed by at least one compressor and expanded in at least one turbine and from which cycle a portion of the medium is withdrawn and expanded in at least one turbine. For replacing the medium withdrawn from the cycle, air is introduced thereinto by means of at least one compressor. At least one of said compressors is driven by the turbine which is operated by the medium withdrawn from the cycle. The plant according to the invention is particularly suitable for ship propulsion.

An object of the invention is to provide a plant or system as set forth above in which the turbine operating the cycle compressor is arranged, with respect to medium flow, ahead of a turbine which produces the useful power output of the plant or the compressor is driven directly by a turbine producing useful power. In the first case a gas heater may be arranged between the two turbines. In the latter case the turbine may comprise two stages in between which the operating medium is reheated by a gas heater.

An object of the invention is the provision of a plant or system of the type set forth in which the compressor introducing air into the cycle is operated by the turbine in the cycle and in which said compressor is provided with control means for regulating the replacement air introduced into the cycle.

Further and other objects of the present invention will be hereinafter set forth in the accompanying specification and claims and shown in the drawings which, by way of illustration, show what I now consider to be preferred embodiments of my invention.

In the drawings.

Like parts are designated by like numerals in both figures of the drawings.

Figure 1:
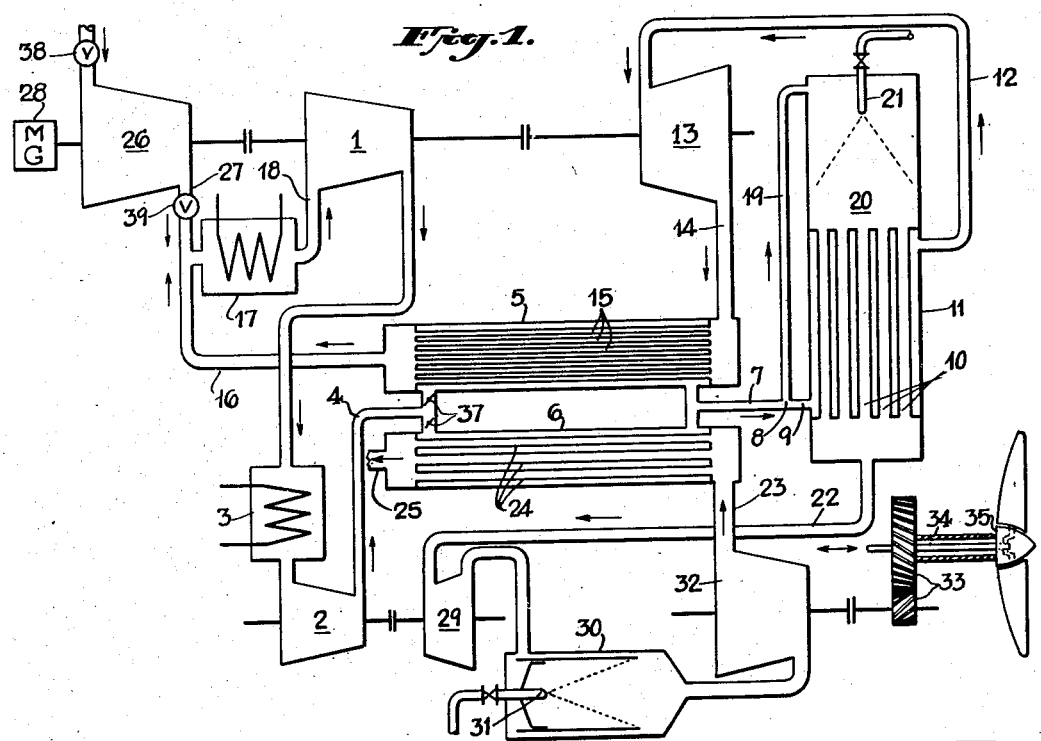
Fig. 1 is a diagrammatic layout of a plant according to the invention.

Referring more particularly to Fig. 1 of the drawings, the air compressed in compressors 1 and 2 and cooled therebetween by cooler 3 is conducted, through conduit 4 in part to a heat exchanger 5 and in part to a heat exchanger 6. The two heat exchangers are arranged in parallel with respect to air flow and act as preheaters. Distribution of the air according to operating requirements of the plant is accomplished by suitable adjustment of valve means 37. The two streams of air coming from heaters 5 and 6 are reunited in preheated condition in a conduit 7. The united stream is divided again at point 8. One part of the preheated air flows through conduit 9 into chamber 11 which surrounds heat exchange tubes 10. The air heated in air heater 10, 11 flows through conduit 12 into turbine 13 where it expands and cools and transfers a considerable portion of its energy to the turbine rotors. The expanded air flows through conduit 14 into heat exchanger 5 in which it flows through tubes 15 through which it transfers heat to the compressed air flowing through the heat exchanger. After leaving the heat exchanger the expanded air goes through conduit 16 into a cooler 17 in which a portion of its residual heat is removed.

From cooler 17 the air flows through conduit 18 back into compressor 1 and resumes the cycle.

At point 8 a portion of the air is removed from the cycle and conducted, through conduit 19, into combustion chamber 20 where it burns the fuel introduced by burner 21. The hot gases produced in the combustion chamber supply heat to air heater 11 through tubes 10 and flow thereafter through conduit 22 into turbine 29. After leaving turbine 29 the gas which still contains oxygen is reheated by burning fuel supplied through burner 31 in combustion chamber 30. The reheated gas flows through and operates turbine 32 and is then conducted through conduit 23 to heat exchanger 6 where it transfers heat through tubes 24 to a part of the compressed air of the cycle. The gas leaving the heat exchanger 6 is conducted through conduit 25 either into the atmosphere or to further consumers or waste heat users which are not shown as they do not form part of the present invention.

For replacement of the portion of the operating medium removed from the cycle at point 8 and, in the form of gas, through conduit 25, atmospheric air is introduced into the cycle by a compressor 26. The compressed air flows through conduit 27 into conduit 16.

At normal load the air is compressed by compressor 26 to and conducted into compressor 1 at about 3 atmospheres above atmospheric pressure. The pressure at the outlet of the high pressure compressor amounts to about 12 atm. above atmosphere. This is the inlet pressure of turbine 13; its outlet pressure is about 3 atm. above atmospheric pressure.

For changing the output of the plant, the speed of compressor 26 may be changed, and/or the amount of air flowing thereinto by manipulation of a valve 38 at the intake of compressor 26 and/or of a valve 39 in conduit 27. Instead, or in combination, the guide blades of the compressor may be adjusted in conventional manner. At light running, compressor 26 increases the pressure of the air by about 0.2 atm. and at maximum overload by about 3.5 atm. The pressures in the cycle at the outlet of compressor 2 amount to 3 and 16 atm. above atmospheric pressure, respectively. The compression ratio in the cycle is thus changed in relation to the output of the plant. It is considerably lower at low loads than at high loads. The output range can be considerably widened by changing the compression ratios in the cycle without impairing efficiency. If particularly high efficiencies are not desired, the output of the plants according to the invention can be increased further by increasing the pressure of the replacement air to, for example, 4 or 5 atm. above atmospheric pressure. The maximum pressure in the cycle will then rise above 16 atm. above atmospheric pressure to, for example, 20 atm., at normal load.

Turbine 13 which is operated by the air in the cycle operates the cycle compressor 1 and the compressor 26 for introducing the replacement air. An electric machine 28 may be connected with the unit consisting of machines 1, 13 and 26. Machine 28 may act as a motor for starting the plant or as a generator for absorbing excess power from turbine 13.

In both alternatives of the illustrated plant layouts the cycle compressor 2 is driven by a turbine which is operated by the or a portion of the medium which is removed from the cycle. In the embodiment of the invention illustrated in Fig. 1 the gas mixture coming from the air heater 11 flows through conduit 22 to a high pressure turbine 29 which is connected with and drives compressor 2. After partial expansion in turbine 29 the gas mixture is reheated in a gas heater 30. The mixture contains still enough oxygen for burning fuel introduced through burner 31 whereby the temperature of the mixture is increased directly. The reheated mixture is further expanded in turbine 32 which drives, through gears 33, shaft 34 of a variable pitch propeller 35, for example for propelling a ship.

Figure 2:
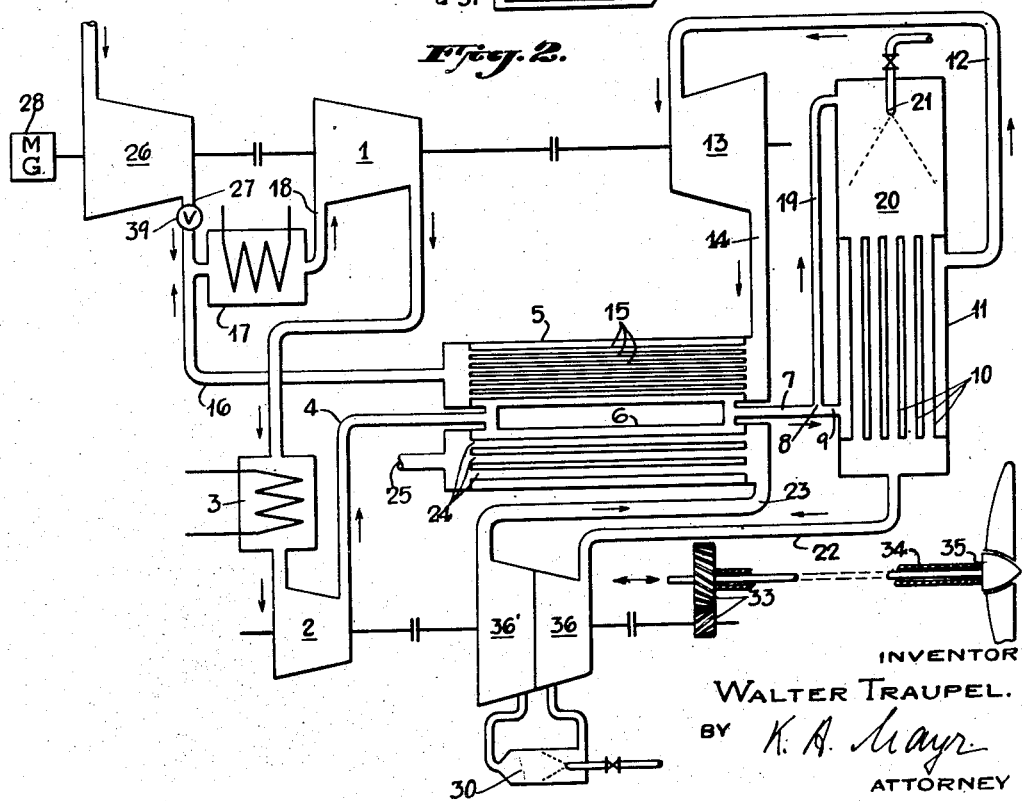
Fig. 2 is a diagrammatic layout of a modified plant according to the invention.

In the plant according to Fig. 2 the gas mixture leaving heater 11 operates a turbine which may have two stages 36 and 36' in between which the gas is reheated in a heater 30. Turbine 36, 36' drives the cycle compressor 2 as well as gears 33 connected to shaft 34 of the reversible ship's propeller 35. The gas expanded in the useful power turbines 32, or 36, 36' is conducted through conduit 23 to air preheater 6 and forms the heating medium thereof.

While I believe the above described embodiments of my invention to be preferred embodiments, I wish it to be understood that I do not desire to be limited to the exact details of design and construction shown and described, for obvious modifications will occur to a person skilled in the art.

I claim:

1. A gas turbine plant comprising an operating medium circulating system including a compressor and a turbine, conduit means appended to said system and removing operating medium therefrom, an additional compressor connected to and operated by said turbine and introducing air into said system for replacing the removed medium, and a turbine interposed in said conduit means and being operated by the medium removed from said system and connected to and operating said first compressor, said first compressor and first turbine being mechanically independent from one another, and said second turbine being mechanically independent from said first turbine.

2. A gas turbine plant comprising an operating medium circulating system comprising a compressor and a turbine, an additional compressor introducing air into said system and being driven by said turbine, conduit means appended to said system and removing operating medium therefrom, turbine means interposed in said conduit means and being connected to and operating the compressor of said circulating system, said first compressor and first turbine being mechanically independent from one another, and said second turbine being mechanically independent from said first turbine, and control means connected with said additional compressor for controlling the amount of air introduced into said system.

3. A gas turbine plant comprising an operating medium circulating system comprising a compressor and a turbine, an additional compressor introducing air into said system and being driven by said turbine, a power consumer, conduit means appended to said system and removing operating medium therefrom, and a second turbine interposed in said conduit means and connected to and driving said power consumer as well as said compressor of said system, said first compressor and first turbine being mechanically independent from one another, and said second turbine being mechanically independent from said first turbine.

4. A gas turbine plant as defined in claim 3, said second turbine having a plurality of stages, and a medium reheater interposed between two of said stages.

5. A gas turbine plant comprising a portion in which operating medium circulates in a cycle, said portion including a compressor and a turbine receiving operating medium from said compressor, a prime mover turbine mechanically independent from said first turbine and operated by medium withdrawn from said cycle and producing outgoing power, an air compressor for replacing medium withdrawn from said cycle and driven by said first turbine and mechanically independent from said first compressor, and an additional turbine mechanically independent from the other turbines and disposed in series in the same operating gas stream as said prime mover turbine and operating said first compressor.

6. In a gas turbine plant as defined in claim 5, a medium reheater interposed in the gas stream between said additional turbine and said prime mover turbine.

WALTER TRAUPEL.

REFERENCES CITED

The following references are of record in the file of this patent:

UNITED STATES PATENTS

| Number | Name | Date |
|---|---|---|
| 2,361,887 | Traupel | Oct. 31, 1944 |

FOREIGN PATENTS

| Number | Country | Date |
|---|---|---|
| 211,358 | Switzerland | Dec. 2, 1940 |